United States Patent [19]
Costa et al.

[11] 3,739,710
[45] June 19, 1973

[54] PROCESSING KETTLE

[75] Inventors: Ralph E. Costa, Lutherville; Walter W. Trevillian, Baltimore, both of Md.

[73] Assignee: B. H. Hubbert & Son, Inc., Baltimore, Md.

[22] Filed: Dec. 30, 1971

[21] Appl. No.: 214,321

[52] U.S. Cl. .................. 99/348, 165/92, 165/133, 165/169
[51] Int. Cl. ........................................ A47j 27/18
[58] Field of Search .................. 99/348, 287, 352, 99/355, 364, 371, 388, 395, 409, 443; 34/179–180, 185; 126/343, 349, 369; 165/87–88, 90, 92, 133, 169; 259/80–81, 84, 116 DIG. 8

[56] References Cited
UNITED STATES PATENTS

| | | | |
|---|---|---|---|
| 422,260 | 2/1890 | Stephens | 165/92 |
| 831,812 | 9/1906 | Weber | 165/90 |
| 1,335,504 | 3/1920 | Horstmann | 165/92 X |
| 1,564,809 | 12/1925 | Amend | 165/133 X |
| 2,345,507 | 3/1944 | Smith | 165/133 X |
| 2,513,254 | 6/1950 | Savage et al. | 99/348 X |
| 2,607,566 | 8/1952 | Saunders | 99/287 UX |
| 2,752,123 | 6/1956 | Deuschel et al. | 165/133 X |
| 3,548,926 | 12/1970 | Archer | 165/87 |

Primary Examiner—John Petrakes
Assistant Examiner—Arthur O. Henderson
Attorney—Herbert I. Cantor and Dennis O. Kraft

[57] ABSTRACT

A novel improved processing kettle is disclosed, the kettle comprising an inner hemispherical plate defining an inner lining and an outer hemispherical shell at least partially surrounding the inner plate and forming a steam-jacket space therebetween. Means are disposed through the outer shell providing entrance and egress of steam to and from the steam-jacket so as to heat a product within the kettle that is being mixed. Importantly, at least a portion of the surface of the inner plate communicating with the steam jacket is contemplated to be highly polished so that this surface portion serves to condense steam within the steam-jacket in droplets rather than in a film so as to improve heat transfer characteristics. In the preferred inventive embodiment, a second source of heat is provided for the processing kettle disposed within the kettle itself, the second source of heat comprising a hollow agitator means thus mixing and thermally agitating the product being processed. Thus, the product within the kettle is heated by heat transfer from the inside agitator, as well as heat transfer through the walls of the vessel due to the steam provided in the surrounding steam-jacket.

6 Claims, 2 Drawing Figures

Patented June 19, 1973

PROCESSING KETTLE

BACKGROUND OF THE INVENTION

This invention generally relates to processing kettles and particularly concerns a novel construction of a so-called steam-jacketed cooking and processing kettle.

Steam-jacketed cooking and processing kettles and other vessels have found widespread acceptance in the food preparation industry. The surrounding steam-jacket typical of such kettles disposed about an inner lining of the vessel effects a quick and easy cooking of most bulk food items since steam is directed into the surrounding steam-jacket and, by means of heat transfer through the inner plate or wall of the kettle, the product being processed is reasonably evenly heated. The typical steam-jacketed kettle of the prior art normally additionally comprises a solid, internal agitator device which serves to mix the product being processed and which further serves to assist in the thermal heat transfer between the external steam-jacket and the product itself.

Processing kettles of the prior art as above-discussed exhibit certain disadvantages particularly as concerns the efficiency of heat transfer into the product being processed and thus the efficiency and economies of the product heating process. One such specific disadvantage of the typical processing kettle concerns the fact that heat is provided only from the outside of the kettle, i.e., through the inside lining of the kettle wall by means of the surrounding steam-jacket. Accordingly, heat transfer from the entering steam to the product being processed within the kettle only occurs about the periphery of the kettle itself, i.e., from the outside of the kettle into the product being mixed. Additionally, the steam delivered to the surrounding steam jacket typically will condense on the inner wall of the steam jacket itself, i.e., the wall nearest to the inside of the processing kettle, and such condensation normally is in the form of a film since the inner surface of the steam jacket typically is left in unfinished or rough form. This condensation film has been found to adversely affect the heat transfer between the steam in the surrounding jacket and the interior of the processing vessel.

SUMMARY OF THE INVENTION

A need thus exists in the art for an improved processing kettle which does not exhibit the above-described disadvantages of prior art construction and which effects a markedly improved heat transfer between an external heating source and a product being processed within the kettle. It is the primary object of the instant invention to provide such an improved processing kettle.

A further, more specific, yet equally important object of the instant invention resides in the provision of an improved processing kettle wherein a source of heat is provided not only on the exterior or outside of the processing kettle, but is additionally provided in the interior of the kettle itself, whereby heating of the product being processed can be accomplished quickly and economically.

An additional though related object of the instant invention concerns the specific provision of an agitator means disposed within the processing kettle itself, the agitator means being steam-heated and thus serving not only as a thermal agitating and mixing mechanism, but also functioning as a second or internal source of heat to the product being processed.

Still another object of the instant invention concerns the provision of a novel technique whereby the deleterious film-wise condensation typically occuring on the interior of the steam-jacket of kettles of prior art construction is substantially eliminated, the heat transfer efficiency between the surrounding steam-jacket and the interior of the processing vessel thus being greatly improved.

These objects as well as others which will become apparent as the description proceeds are implemented by the instant invention which, as aforestated, comprises an improved steam-jacketed processing kettle or vessel. The kettle includes an inner hemispherical head or plate defining an inner lining for the kettle itself with an outer hemispherical shell at least partially surrounding the inner plate and forming a steam-jacket space therebetween into which steam enters and exits. Heat transfer from the steam in the surrounding steam-jacket into the interior of the processing kettle takes place via the inner lining of the kettle as is typical with prior art constructions. Importantly, however, at least a portion of the surface of the inner plate or lining communicating with the steam-jacket is contemplated to be provided with a high polish, the polished surface defining means to condense steam within the steam-jacket in droplets on the surface much in the same manner as water would "bubble" on a waxed surface. In this fashion, a film condensate is not obtained and the adverse heat-transfer characteristics of a film condensate are eliminated thus greatly facilitating heat transfer from the steam-jacket through the inner plate into the processing kettle.

The novel improved processing kettle of the instant invention further contemplates the provision of an internal agitator means disposed within the processing kettle, which agitator means serves to mix and to thermally agitate the product being processed. As opposed to conventional constructions, the agitator means of the instant invention is contemplated to be hollow with steam being caused to flow within the hollowed portions thereof. The hollowed agitator means thus forms a conduit for the passage of steam and the agitator means is thereby heated to provide a heat source that is internal of the kettle and which is in addition to the outside or external heat source of the kettle provided by the surrounding steam-jacket.

BRIEF DESCRIPTION OF THE DRAWINGS

The invention itself will be better understood and additional features and advantages thereof will become apparent by the following detailed description of a preferred inventive embodiment, this description referring to the appended sheets of drawings, wherein.

Throughout the several views of the drawings, like elements have been designated by the same reference numerals.

DETAILED DESCRIPTION OF A PREFERRED INVENTIVE EMBODIMENT

Figure 1:
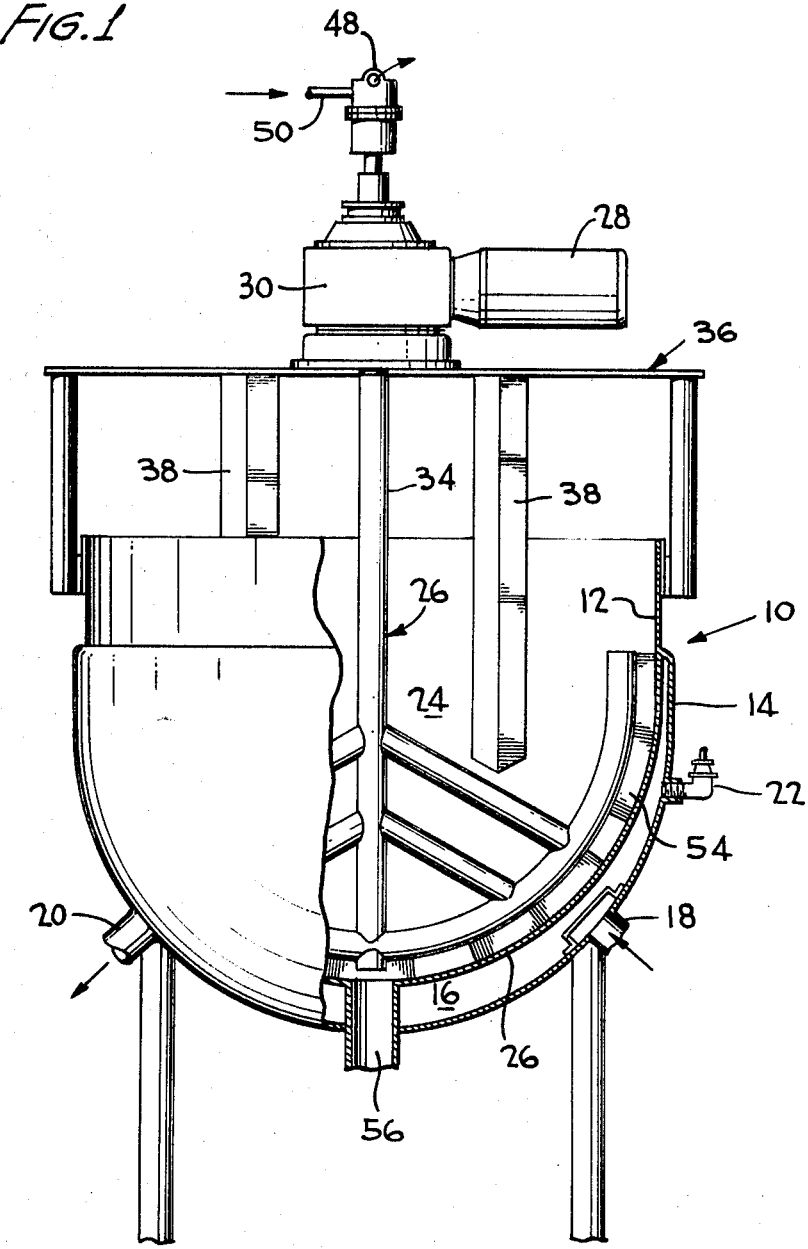
FIG. 1 is an elevational plan view, partially broken away for illustrative clarity, of an improved processing kettle embodying the novel features of the instant invention.

Referring now to the drawings and particularly to FIG. 1 thereof, the novel processing kettle of the instant invention is generally designated by reference numeral 10 and will be seen to comprise an inner hemispherical head or plate 12 forming a container or vessel, the inner hemispherical plate 12 being at least partially surrounded by an outer hemispherical shell 14 which forms a steam-jacket space 16 about the inner head 12. Couplings 18 and 20 communicating with the steam-jacket 16 through the outer hemispherical shell 14 define means providing entrance and egress of steam to and from the interior steam-jacket. So as to protect the kettle from unduly high steam pressures within steam-jacket 16, a safety, or "blow" valve 22 communicates with the interior of the jacket, as is conventional.

During operation of the processing kettle as above-discussed, steam is introduced to the steam-jacket 16 via inlet 18 and is withdrawn from the steam-jacket 16 via outlet 20 through which any condensate that might form within the steam-jacket may also be discharged. Heat transfer from the steam within the surrounding jacket 16 to a product being processed within the interior 24 of the vessel itself takes place through the inner hemispherical head or plate 12 and, in this respect, surface 26 of the inner hemispherical head 12 is normally constructed or plated with nickel, for example, in an effort to insure good heat transfer from the surrounding jacket 16, through the inner hemispherical plate 12, and into the interior 24 of the vessel. Even with such a relatively expensive expedient, good heat transfer from the surrounding steam-jacket 16 to the interior 24 of the vessel 10 is difficult to achieve.

Specifically, the surface 26 of the inner hemispherical head or plate 12 which communicates with the steam-jacket 16 is normally of rough or unfinished construction and, as such, steam within the surrounding steam-jacket 16 tends to condense upon surface 26 in what is termed a film-wise manner. The existence of this condensate film has been found to deleteriously affect heat transfer between the surrounding steam-jacket 16 and the interior 24 of the vessel, since, in effect, this film presents a barrier to the heat itself.

As opposed to the conventional construction of the inner hemispherical plate or head 12 and specifically of the interior wall 26 thereof as above-discussed, the instant invention contemplates to polish at least a portion of surface 26 of the inner hemispherical head or plate 12 such that this surface portion defines a means to condense steam within the steam-jacket 16 in droplets on the surface rather than as a film condensate. With such a polished surface, steam within the surrounding jacket 16 still condenses on surface 26, but the condensate in in the form of droplets or bubbles rather than in the form of a film and, as such, the barrier affect of a condensate film no longer exists and heat transfer between the surrounding steam-jacket 16 and the interior 24 of the vessel 10 is markedly improved.

The surface portion 26 of the inner hemispherical head or plate 12 preferably is polished by means of any suitable technique such as a belt grinder having an abrasiveness of 180 grit, and then followed by fine buffing with cloth and rouge. It has been found that the coefficient of heat transfer from the surrounding steam-jacket 16 into the interior 24 of vessel 10 can be up to eight times greater with a polished surface as above-described than is the coefficient of heat transfer through an unpolished surface wherein the film-like condensate "barrier" layer occurs. And, with the utilization of the polished interior surface portion, the processing kettle of the instant invention no longer requires a formation of a nickel plating or coating on surface 26, surface 26 as well as the remaining portions of the inner hemispherical plate or head 12 being constructed only of conventional stainless steel.

When utilizing such a polished internal surface Applicants have found that the greatest heat transfer advantages can be obtained when the steam introduced into the steam-jacket 16 includes a conventional cleaning agent, which cleaning agent tends to keep the polished surface 26 clean of contaminants and insure the drop-wise condensation of steam thereon.

The processing vessel of the instant invention further includes an agitator means generally designated 26 and disposed within the interior 24 of the vessel 10, the agitator means serving to stir and thermally agitate and mix the product being processed. In this respect, rotary motion is provided to the agitator 26 by means of an external electric motor 28 and an associated rotary coupling joint 30 containing a typical worm-drive gearing arrangement 32, for example. as can best be seen from an inspection of FIG. 2. Specifically, the worm-drive from the electric motor 28 is adapted to engage the illustrated ring gear disposed about a vertical shaft 34 of the agitator means 26, the motor 28 as well as the rotary coupling joint or mechanism 30 being disposed in a position above the interior 24 of the processing vessel or kettle 10 on an elevated platform generally designated 36, which platform can be withdrawn from the processing kettle 10 by non-illustrated means so as to likewise withdraw the agitator means 26 from the interior 24 of the kettle. As is conventional, downwardly depending fixed fingers 38 may be disposed from the platform 36 so as to assist the agitator means 26 in breaking up large particles of food or other product being processed within the interior 24 of the vessel 10. Additionally, a hinged cover plate or the like could be disposed about the top of the processing kettle 10 in conventional manner, if so desired.

Figure 2:
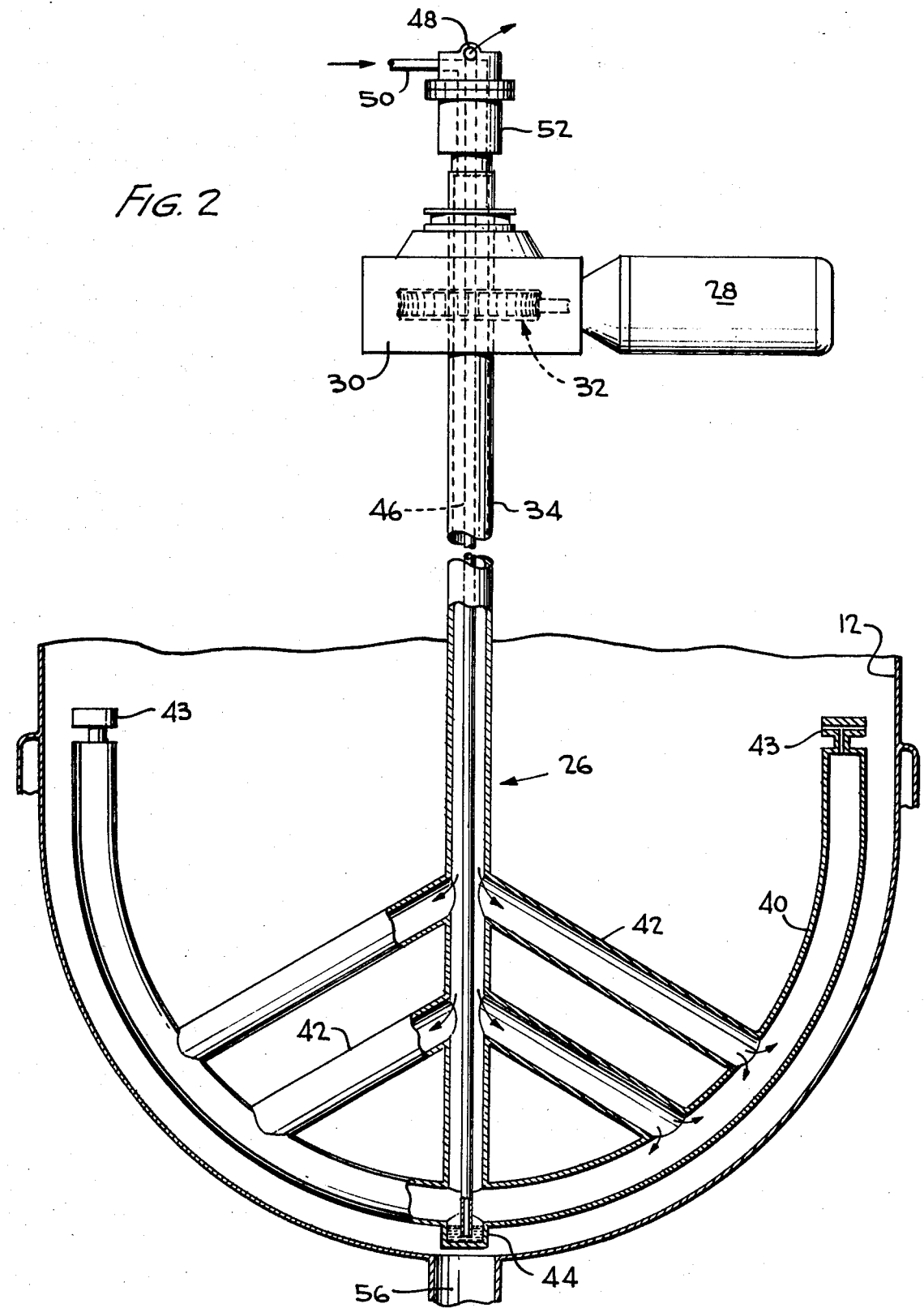
FIG. 2 is a plan illustration, again partially broken away for illustrative clarity, specifically depicting the details of construction of the internal hollow agitator means of the instant invention.

Referring specifically, now, to FIG. 2 of the appended drawings, the novel construction of the agitator means 26 of the instant invention can be seen. Specifically, the elongated vertical shaft 34 of the agitator means 26 is contemplated to be of hollow construction and a hollow arcuate mixing member 40 which follows the contour of the inner lining or head 12 of the vessel is coupled to the elongated shaft 34 of the agitator means 26 and communicates with the interior thereof. In the preferred embodiment of the agitator means 26, hollow conduits 42 are disposed between the hollow vertical shaft 34 and locations along the length of the hollow arcuate mixing member 40, conduits 42 defining brace members. Conventional steam air valves 43 may be coupled to the mixing member 40 as shown.

At the lower-most point of the hollow arcuate mixing member 40, a condensate collector chamber 44 is disposed, the purpose of which will become apparent from the description hereinbelow. Finally, the hollow agitator means 26 of the instant invention will be seen to include an elongated hollow tube 46 disposed concentrically within the hollow shaft 34 and communicating at one end thereof with the interior of the arcuate mixing member 40 and specifically with the condensate collector chamber 44. The hollow tube 46 exits the agitator means 26 at an orifice 48 provided at the top of the agitator means 26 and it will further be seen that an orifice 50, also provided at the top of agitator means 26 communicates with the interior of the elongated hollow shaft 34. Orifice 50 defines a means providing entrance of steam to the agitator means 26, while orifice 48 defines means providing an exit of steam and condensate from the agitator means 26, orifices 48 and 50 being physically disposed in a coupling block or member 52 of suitable construction.

In operation, a product to be processed by the kettle 10 of the instant invention is disposed within the interior 24 of the kettle. Steam is then directed into the surrounding steam-jacket 16 in the fashion above-described and heat transfer takes place into the product being processed via the inner hemispherical plate 12. The agitator assembly 26 is simultaneously caused to be rotated by motor 28 and the rotary gear or coupling box 30, the rotational movement of the agitator serving to mix and agitate the product within the interior 24 of the kettle 10 and further serving to improve the heat transfer between the steam-jacket 16 and the product. The agitator means 26 itself, however, will be seen to comprise a second or internal heat source for heating the product.

In this respect, steam is additionally introduced into inlet 50 above-described, the steam then flowing downwardly through the vertically extending hollow shaft 34 generally along the paths depicted by the arrows within the shaft 34. The steam flows through each of the structural conduit members 42 and into the arcuate portion 40 of the agitator means, all surfaces of the agitator means 26 defining heat transfer surfaces for transferring heat from the steam into the product being processed.

At least a portion or some percentage of the steam within the agitator means 26 will, of course, condense within the agitator means 26 and such condensate flows into the condensate collector chamber 44 due to gravity and due to the configuration of the hollow arcuate mixing member 40. The condensate collector chamber 44 also functions as a general collecting chamber for the steam to be expelled from within the interior of agitator means 26 itself and, as above-discussed, the lower portion of the internal hollow tube 46 communicates with the collector chamber 44. Accordingly, steam to be discharged from agitator 26 as well as any condensate that has formed within agitator means 26 is taken up from the condensate collector chamber 44 through the internal hollow tube 46 and is expelled through the steam outlet orifice or opening 48. In this fashion, the agitator means 26 of the instant invention defines an additional heat source for the processing vessel, this additional heat source being an internal heat source and assisting with the heating of the product within the interior of the vessel.

In actual use of the above-described apparatus, the provision of an internal and hollow steam-heated agitator means effecting a second and internal heat source has been seen to increase the heating efficiency of the product being processed within the interior 24 of the vessel 10 by as much as 25 percent, thus greatly reducing the amount of heating time required.

Continuing with the description of the invention and now referring again specifically to FIG. 1 of the appended drawings, the agitator means 26 is contemplated to include a plurality of scraper blades 54 as is conventional, which blades can be constructed of any suitable material such as Teflon, for example, so as to scrape any stagnant film formed in the interior of the vessel and thus to further increase the efficiency of heat transfer between the surrounding steam-jacket 16 and the vessel interior. Additionally, and as is conventional, an outlet 56 is provided at the bottom of the processing kettle 10 which communicates with the interior 24 of the kettle 10 through the inner and outer hemispherical plates or linings 12 and 14, respectively. Outlet 56 serves to provide an exit path for processed material from the interior of the kettle 10.

Throughout the foregoing specification, the novel improved processing kettle of the instant invention has been described only in terms of a preferred inventive embodiment and it should be understood that the invention is not limited to the exact details of constructions shown and described herein for obvious modifications will occur to persons skilled in the art. For example, while steam was specifically discussed as the heating exchange medium for the kettle and agitator, it should be apparent that other suitable heat exchange mediums such as water or other fluids could be used. Or, for that matter, and if desired, the hollow agitator and/or the kettle jacket could be utilized as a mechanism to effect cooling rather than heating of the material being processed within the kettle. In this respect, a heat exchange medium such as a refrigerated fluid could be passed through the interior of the agitator and/or through the jacket of the kettle.

It should now be appreciated that the objects initially set forth at the outset of this specification have now been successfully achieved.

Accordingly, What is claimed is:

1. An improved processing kettle comprising, in combination, an inner hemispherical plate defining an inner lining for the processing kettle, an outer hemispherical shell at least partially surrounding said inner plate and forming a jacket space therebetween, means through said outer shell providing entrance and egress of a heat exchange medium to and from said jacket, and wherein at least a portion of the surface of said inner plate communicating with said jacket is a polished surface defining means to condense said heat exchange medium within said jacket in droplets on said surface whereby heat transfer between said jacket and the processing kettle through said inner plate is facilitated, said kettle further including a substantially hollow agitator means disposed inside the kettle for stirring a product to be processed therewithin, said hollow agitator means comprising an elongated hollow vertical shaft and a hollow arcuate mixing member attached thereto and substantially following the contours of the inner lining of the kettle with the interior of said hollow mixing member communicating with the interior of said hollow vertical shaft, an elongated hollow tube disposed within said hollow shaft and extending downwardly into said hollow mixing member at the region of its attachment to said hollow vertical shaft, said tube having an opening at its lowermost end such that the interior of said tube communicates with the interior of said hollow mixing member at said attachment region, said kettle further including means coupled to a respective one of said hollow shaft and said hollow tube for providing entrance and egress of a heat exchange medium into said hollow agitator means whereby said agitator means defines an additional heat exchange source for the processing kettle with heat being transferred to a product within the processing kettle from the external jacket and with heat exchange further being effected by the internal agitator means.

2. A processing kettle as defined in claim 1, further including hollow conduits disposed between said hollow vertical shaft and locations along the length of said hollow arcuate mixing member, said conduits defining brace members for said agitator means as well as additional paths for the circulation of said heat medium within said agitator means.

3. A processing kettle as defined in claim 1, further including a condensate collector chamber means for said heat exchange medium disposed in said hollow mixing member in the region of communication of said elongated hollow tube and said hollow mixing member.

4. A hollow agitator means for use with a processing kettle, said hollow agitator means being adapted to be disposed inside the kettle for stirring a product to be processed therewithin, said agitator means comprising an elongated hollow vertical shaft and a hollow arcuate mixing member attached thereto and substantially following the contours of the kettle with the interior of said hollow mixing member communicating with the interior of said hollow vertical shaft, an elongated hollow tube disposed within said hollow shaft and extending downwardly into said hollow mixing member at the region of its attachment to said hollow shaft, said tube having an opening at its lowermost end such that the interior of said tube communicates with the interior of said hollow mixing member at said attachment region, and means coupled to a respective one of said hollow shaft and said hollow tube for providing entrance and egress of a heat exchange medium to said hollow agitator means, whereby said agitator means defines a heat exchange source for the processing kettle with heat exchange being effected between said agitator means and the product within the processing kettle.

5. An agitator as defined in claim 4, further including hollow conduits disposed between said hollow vertical shaft and locations along the length of said hollow arcuate mixing member, said conduits defining brace members for said agitator means as well as additional paths for the circulation of said heat medium.

6. An agitator as defined in claim 4, further including a condensate collector chamber means for said heat exchange medium disposed in said hollow mixing member in the region of communication of said elongated hollow tube and said hollow mixing member.

* * * * *